United States Patent [19]
Harrison et al.

[11] Patent Number: 5,306,554
[45] Date of Patent: Apr. 26, 1994

[54] CONSOLIDATED MEMBER AND METHOD AND PREFORM FOR MAKING

[75] Inventors: Michael G. Harrison, West Chester; Michael L. Millard, Sharonville; Andrew Szweda, Middletown, all of Ohio

[73] Assignee: General Electric Company, Cincinnati, Ohio

[21] Appl. No.: 866,944

[22] Filed: Apr. 6, 1992

Related U.S. Application Data

[63] Continuation of Ser. No. 341,001, Apr. 14, 1989, abandoned.

[51] Int. Cl.$^5$ .................... B32B 19/06; C04B 35/02
[52] U.S. Cl. ..................... 428/283; 428/241; 428/246; 428/294; 428/324; 428/331; 428/688; 428/702; 501/95; 501/128; 501/154; 264/56; 264/63; 264/66
[58] Field of Search ............. 428/241, 242, 246, 283, 428/294, 324, 330, 331, 688, 702; 501/95, 103, 133, 97, 154, 128; 264/56, 63, 64, 66

[56] References Cited

U.S. PATENT DOCUMENTS

| | | | |
|---|---|---|---|
| 3,549,393 | 12/1970 | Elarde | 501/141 |
| 3,827,892 | 8/1974 | McCauley | 428/324 X |
| 4,020,234 | 4/1977 | Gardner | 428/433 |
| 4,265,669 | 5/1981 | Starling et al. | 264/65 X |
| 4,284,664 | 8/1981 | Rauch, Sr. | 428/241 X |
| 4,849,382 | 2/1988 | Shibata | 501/95 |
| 4,861,646 | 8/1989 | Barringer et al. | 428/210 |
| 4,885,199 | 12/1989 | Corbin et al. | 428/113 |
| 4,892,846 | 1/1990 | Rogers et al. | 501/8 |
| 4,919,991 | 4/1990 | Gadkaree | 428/113 |
| 4,935,387 | 6/1990 | Beall et al. | 501/3 |
| 5,034,356 | 7/1991 | Brun et al. | 501/95 |

FOREIGN PATENT DOCUMENTS

| | | |
|---|---|---|
| 227019A2 | 7/1987 | European Pat. Off. . |
| 8001109 | 3/1981 | PCT Int'l Appl. . |
| 00189 | 10/1986 | PCT Int'l Appl. . |
| 00396 | 4/1988 | PCT Int'l Appl. . |

*Primary Examiner*—George F. Lesmes
*Assistant Examiner*—Christopher Brown
*Attorney, Agent, or Firm*—Jerome C. Squillaro; Carmen Santa Maria

[57] ABSTRACT

A method of making a consolidated, reinforced composite member from a matrix mixture including a consolidation shrinkable discontinuous ceramic material, for example ceramic particles, and a selected amount of a particulate inorganic filler which will exhibit net expansion relative to the discontinuous material, the mixture being interspersed about reinforcing fibers. Subsequent consolidation of a preform of such materials can be conducted substantially at ambient pressure, without application of additional pressure, to provide an improved reinforced composite article.

33 Claims, 2 Drawing Sheets

CONSOLIDATED MEMBER AND METHOD AND PREFORM FOR MAKING

This application is a continuation of application Ser. No. 07/341,001, filed Apr. 4, 1989, now abandoned.

This invention relates to making members or articles of consolidated particles of material, and, more particularly, to consolidated reinforced members made at ambient pressure.

CROSS REFERENCE TO RELATED APPLICATION

This application relates to co-pending and concurrently filed U.S. application Ser. No. 07/341,000, now abandoned, entitled "Fiber Reinforced Ceramic Matrix Composite Member and Method for Making."

BACKGROUND OF THE INVENTION

Use of ceramics in the form of high temperature operating articles, such as components for power generating apparatus including automotive engines, gas turbines, etc., is attractive based on the light weight and strength at high temperatures of certain ceramics. One typical component is a gas turbine engine strut. However, monolithic ceramic structures, without reinforcement, are brittle. Without assistance from additional incorporated, reinforcing structures, such members may not meet reliability requirements for such strenuous use.

In an attempt to overcome that deficiency, certain fracture resistant ceramic matrix composites have been reported. These have incorporated fibers of various size and types, for example long fibers or filaments, short or chopped fibers, whiskers, etc. All of these types are referred to for simplicity herein as "fibers". Some fibers have been coated, for example with carbon, boron nitride, or other materials, applied to prevent strong reactions from occurring between the reinforcement and matrix. Inclusion of such fibers within the ceramic matrix was made to resist brittle fracture behavior.

Reported methods for final consolidation of ceramic matrix composites have included hot mechanical pressing or hot isostatic pressing techniques applied to a preform of ceramic matrix and reinforcing fiber in a shaped, heated die or in a high pressure, high temperature autoclave. Such techniques generally require that the matrix include liquid phases or sintering aids to allow the matrix material to flow around the reinforcing fiber architecture. Such techniques are expensive as well as time consuming and rely on intricate, complex equipment for the production of such ceramic matrix composites.

Other techniques, for example chemical vapor deposition or polymer precursor decomposition, do not require liquid phases as sintering aids. They rely on open porosity of the fiber structure for the transfer of the matrix materials throughout the reinforcing arrangement. In all of these known techniques, long times are required for such infiltration and generally at least about 8-20% porosity results.

SUMMARY OF THE INVENTION

Briefly, in one form, the present invention provides a method of making a consolidated, reinforced composite member from a preform comprising reinforcing fibers and a matrix interspersed about the fibers. The matrix is a mixture including a discontinuous material, for example ceramic particles, which will consolidate and produce a predetermined shrinkage amount by heating at a preselected consolidation temperature. To enable the consolidation to be conducted substantially at ambient pressure, without the need for application of additional pressure, the mixture includes a particulate inorganic filler which will exhibit net expansion relative to the discontinuous material when heated to the preselected consolidation temperature. The proportion of the filler in the mixture is selected so that expansion of the filler substantially counteracts shrinkage of the discontinuous material during consolidation. The Preform is consolidated at the consolidation temperature substantially at ambient pressure.

The consolidated reinforced composite member form of the present invention is identified by including in the matrix, interspersed about the reinforcing fibers, a lathy-type crystal structure of the inorganic filler. In addition, the member is characterized by a shrinkage within the member of no more than about 4%.

DESCRIPTION OF THE PREFERRED EMBODIMENTS

Figure 1:
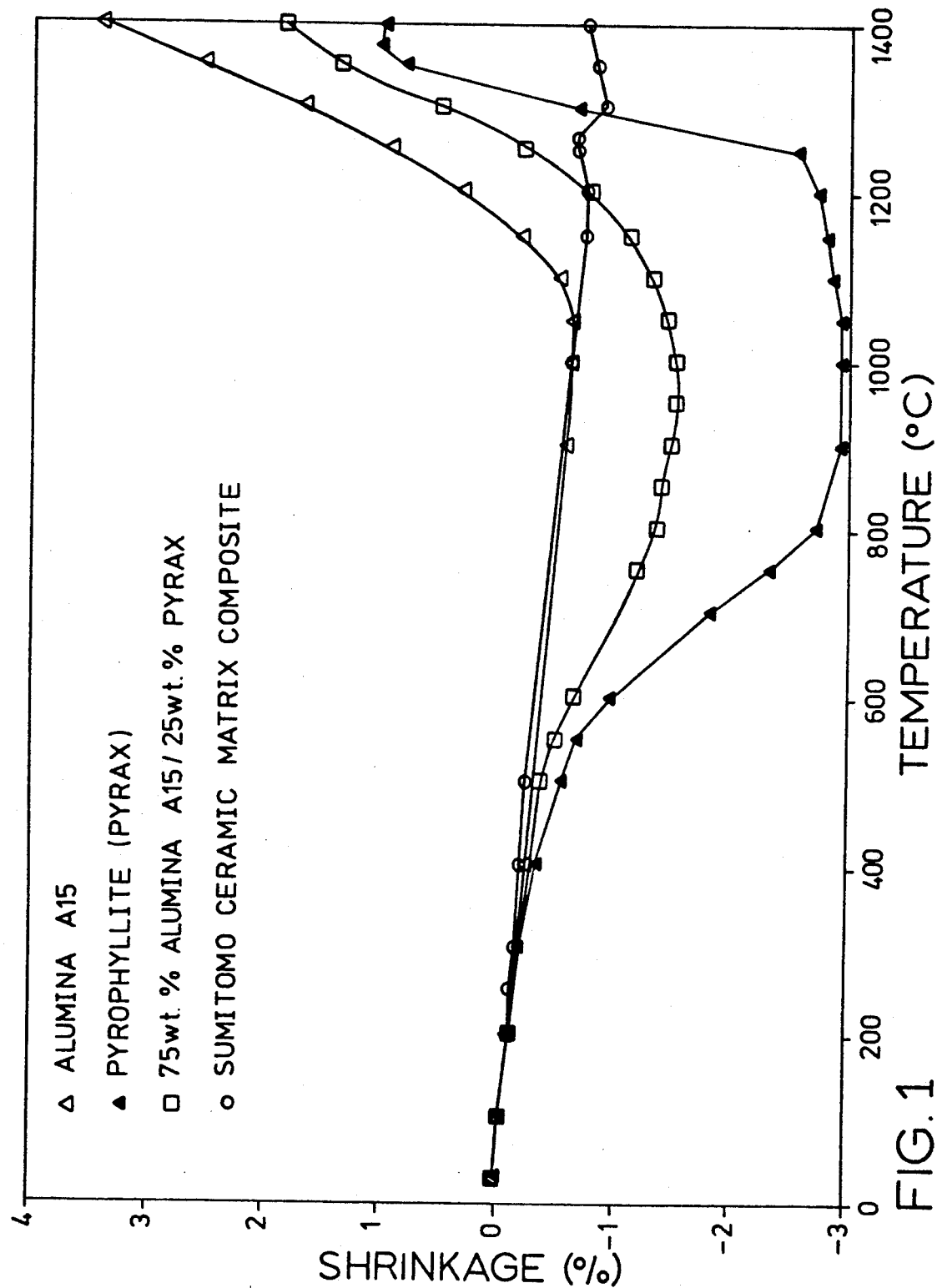
FIG. 1 is a graphical comparison of shrinkage data for selected materials and a composite, consolidated member.

Fracture resistant, fiber reinforced ceramic matrix composites offer the designers of high temperature components for gas turbine engines an opportunity to specify strong, lightweight members. However, the manufacture of such components can be complex, time consuming, and costly. This is based, at least in part, on the equipment and intricate processing required to produce a reliable, quality product.

One form of fabrication of a ceramic matrix composite can require elevated temperature processing to consolidate or sinter the matrix around the fibers. Since the fibers are dense, they will expand during this consolidation process. However, the matrix will tend to shrink and bond to the fibers. This mismatch between expansion and shrinkage results in severe stresses between fiber and matrix, leading to tensile cracks in the matrix normal to the fiber.

The present invention provides an improved, expedient, reliable method, and an associated mixture of materials, for avoiding known problems and for making a reinforced ceramic matrix composite without certain of such complex apparatus. A principal basis for the invention is providing a mixture including an ingredient which generally expands to counteract consolidation shrinkage of another ingredient, thereby significantly reducing net shrinkage in the finished member. Use of such mixture of ingredients eliminates the need for complex finishing pressure apparatus, enabling the member to be finished at ambient pressure.

Typical of the ceramic particles used for ceramic matrices are the oxides of such elements as Al, Si, Ca and Zr, and their mixtures. Commercially available of such materials include $Al_2O_3$, $SiO_2$, $CaO$, $ZrO_2$, and $CaO \cdot Al_2O_3$. Ceramic particle sizes in the range between about 75 microns to 0.2 micron in diameter have been tested as a matrix in the evaluation of the present invention. Each of such ceramics, when used as a structure, will shrink when fired to an elevated consolidating temperature. For example, a form of alumina will experience a linear shrinkage in the range of about 3–4% at 1400° C.

According to the present invention, such shrinkage is counteracted by mixing with the discontinuous material, for example ceramic particles, prior to consolidation, particles of an inorganic filler which will exhibit net expansion relative to the ceramic particles during heating to the consolidation temperature. As used herein, the term "discontinuous material" is intended to mean powder, particles, small fragments, flakes of material, whiskers, etc. Tested in the evaluation of the present invention are the inorganic filler materials, of lathy-type crystal shape, and identified in the following Table I.

TABLE I

| FILLER MATERIALS | | |
|---|---|---|
| IDENTIFICATION | | LATHY-TYPE |
| MINERALOGICAL NAME | COMPOSITION | CRYSTAL SHAPE |
| Pyrophyllite | $Al_2O_3.4SiO_2.H_2O$ | laminar |
| Wollastonite | $CaO.SiO_2$ | bladed/elongated with circular crystals |
| Mica | $K_2O.3Al_2O_3.6SiO_2.2H_2O$ | plate-like |
| Talc | $3MgO.4SiO_2.H_2O$ | flat flake |
| Montmorillonite | $(Al,Fe,Mg)O_2.4SiO_2.H_2O$ | elongated |
| Kyanite | $3Al_2O_3.3SiO_2$ | bladed/elongated |

A comparison of shrinkage data of a typical ceramic with an organic filler material of the lathy-type crystal shape, and with a mixture of the two, according to the present invention, is shown in the graphical presentation of FIG. 1. In that figure, the ceramic is alumina, in the commercially available form of Alumina A15, and the organic filler is pyrophyllite, in the commercially available form identified as Pyrax material. Included in FIG. 1 not only are data for a mixture of the ceramic and the filler but also data for that mixture as a matrix for a reinforced composite member. In the composite member, the reinforcing fibers are rovings of a commercially available material, identified as Sumitomo material, and made of fibers of an aluminosilicate (85% $Al_2O_3$, 15% $SiO_2$) which expands upon heating.

As can be seen from FIG. 1, sintering of Alumina A15 at a temperature of 1400° C. results in a linear shrinkage of 3.5%. It has been observed that if fibers, for example Sumitomo fibers, are incorporated into the Alumina A15, which becomes an interspersed matrix for a composite structure, and then fired at 1400° C., the 3.5% alumina shrinkage identified above will result in large cracks developing in the matrix, generally perpendicular to the fiber axis.

FIG. 1 also shows the shrinkage characteristics for a pyrophyllite marketed as Pyrax material. When Pyrophyllite is fired up to 1400° C., an expansion of the material is seen to occur above about 400° C., attaining a maximum expansion of about 3% at about 1000° C. Above that temperature, the material begins to shrink, but the total shrinkage at 1400° C. is only about 1%. Therefore, pyrophyllite material, as an example of the filler material used in the present invention, will exhibit net expansion relative to the particulate material, represented here by alumina, when the two are heated to a temperature such as 1400° C.

Mixtures of pyrophyllite and alumina can be controlled as desired, within required limits, to counteract shrinkage of the alumina. This is shown in FIG. 1 by the mixture of, by weight, 75% Alumina A15 and 25% Pyrax material. This mixture is within the range of the invention of 50–93% ceramic and 7–50% filler, successfully tested in accordance with the present invention. The term "mixture" in respect to the present invention and its properties, is not intended to include solvents and binding systems generally added to the mixture to hold certain shapes. In that example, the addition of 25 weight Percent Pyrax material reduced the shrinkage to about 1.5% at 1400° C. However with addition of a fiber such as Sumitomo fiber, which expands upon heating, a dramatically more significant change in shrinkage data occurs, as shown by FIG. 1. The fiber dimensions in FIG. 1, at 35 volume percent, was 17 microns in diameter. With a composite of the matrix mixture, described above, having reinforcing fibers according to the present invention, no shrinkage was observed to occur. This is believed to be due to the restraining effect of the fibers on the matrix. As a result of this relationship, a preform of these materials can be consolidated into a member or article without the need for pressure apparatus generally required with known methods: the consolidation can be conducted substantially at ambient pressure.

Figure 2:
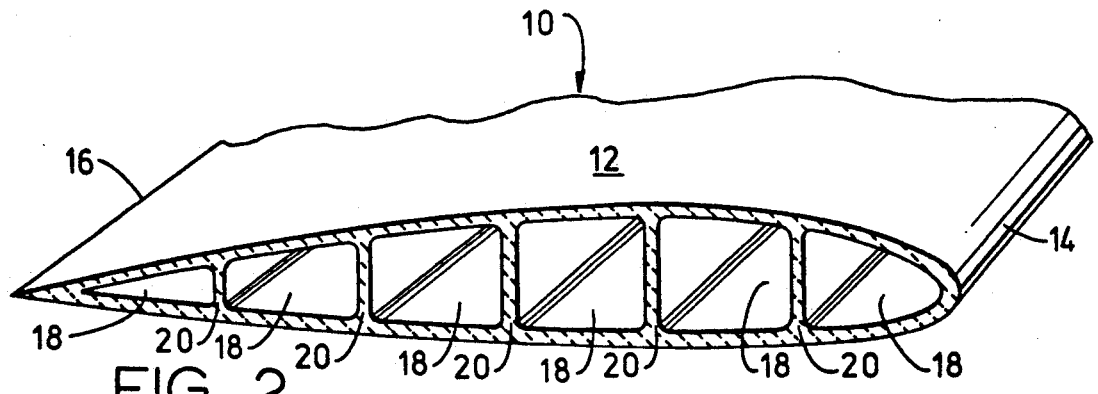
FIG. 2 is a fragmentary, sectional perspective view of a portion of a gas turbine engine strut.

Typical of members which can be made according to the present invention is an airfoil-shaped strut, useful in a gas turbine engine hot section, and shown in the fragmentary, sectional perspective view of FIG. 2. The strut, shown generally at 10, includes a strut body 12 having leading edge 14 and trailing edge 16. Strut 10 is sometimes referred to as a hollow strut because of the presence of a plurability of cavities 18 therein separated by ribs 20.

Figure 3:
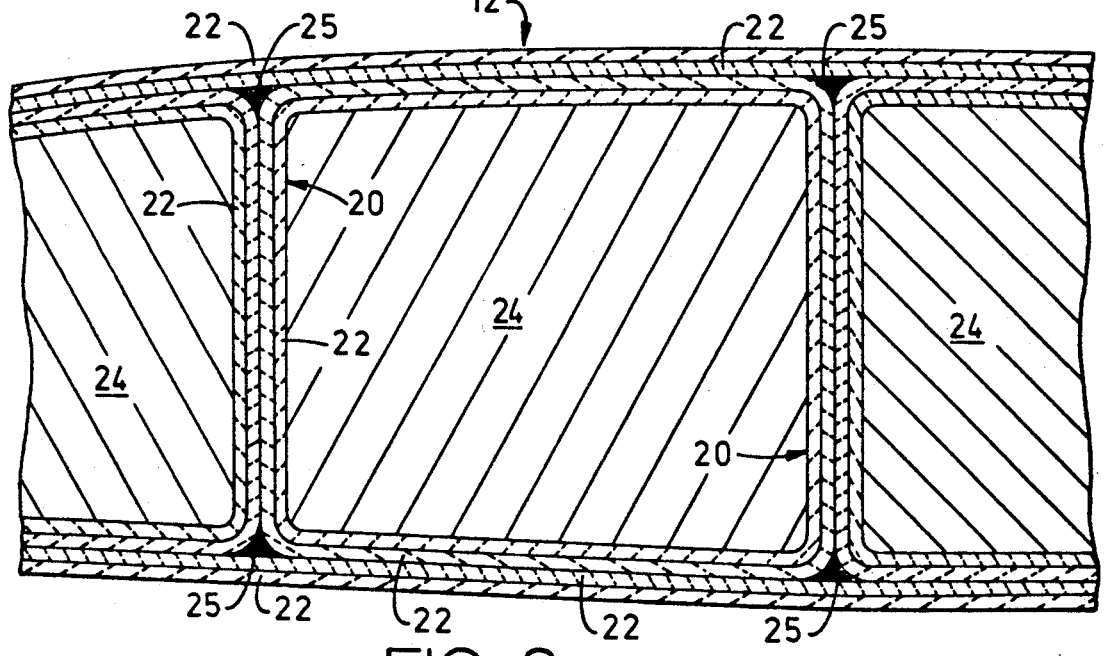
FIG. 3 is a fragmentary, diagrammatic sectional view of plies of ceramic matrix composite disposed about forming blocks.

Strut 10 can be made by providing a plurality of plies such as laminations, sheets, tapes, etc., made by interspersing a matrix mixture of a particulate material and particulate inorganic filler, according to the present invention, about reinforcing fibers, for example in fabric form. In the present invention, it has been recognized that the reinforcing fibers be included in the range of about 10–50 vol % of the member, and preferably 30–40 vol %. Less than 10 vol % provides insufficient reinforcement strength, and at greater than about 50 vol % the fibers are spaced too closely for the disposition about them of adequate matrix. The fragmentary sectional view of FIG. 3 is diagrammatic and representative of disposition of such plies, identified at 22, about forming blocks 24, such as of aluminum, as an initial formation of the preform configuration of a portion of the strut of FIG. 2 in relation to the shape of that finished strut. In reality, each ply for this member will have a thickness dependent on fiber and form, as is well known in the art. For example, typical thicknesses are in the range of about 0.008–0.020 inches. However, as is well known in the art, the number of plies actually required to provide such a laminated structure would be many more than those presented for simplicity in FIG. 3. Additional individual fibers 25 are disposed between plies within potential spaces between plies at the edge curvature regions of blocks 24 to reduce voids.

Figure 4:
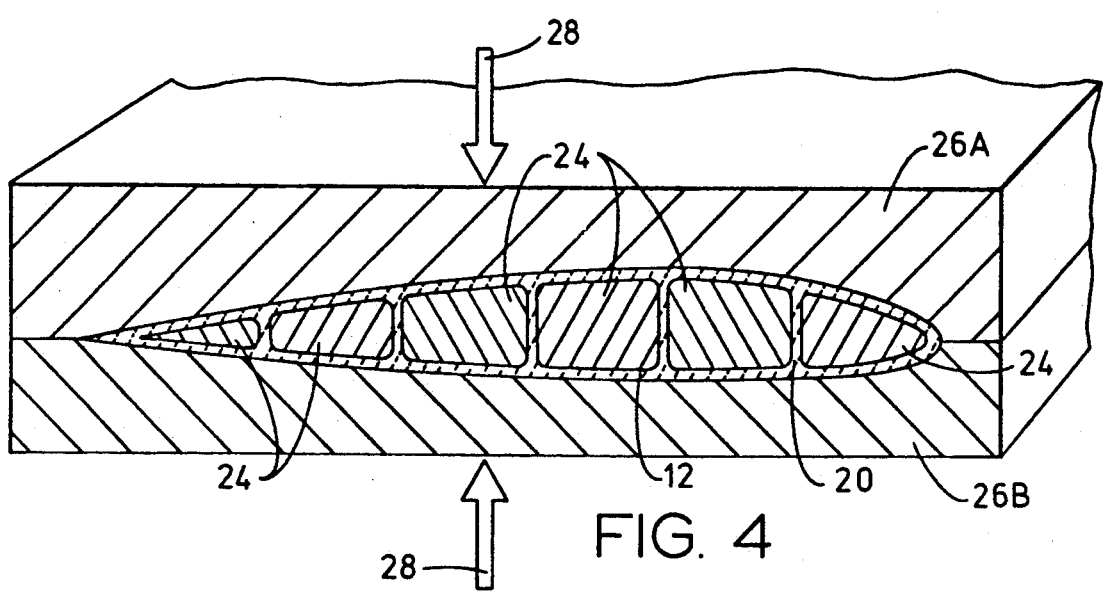
FIG. 4 is a fragmentary, sectional perspective view of the member of FIG. 3 disposed in forming die portions.

After formation of the member of FIG. 3 assembled about forming blocks 24, the assembly is placed within appropriately shaped, mating forming dies 26A and 26B in FIG. 4 for the purpose of laminating the member into an article preform. Typically, a pressure, represented by arrows 28, in the range of about 150–1000 pounds per square inch, is applied to the member while it is heated, for example in the range of 150°–400° F., for a time adequate to allow proper lamination to occur. Such a temperature is not adequate to enable consolidation of the materials of construction to occur.

After lamination, the preform thus provided is removed from the forming dies and the forming blocks are removed. The preform then is placed in a furnace, without application to it of pressure in addition to ambient, and heated to a temperature below 1400° C. in a controlled manner to remove binders and plasticizers, and then to a consolidation temperature such as 1400° C. or above to sinter the preform into a substantially dense ceramic matrix composite article of FIG. 2. This sintering can be referred to as pressureless sintering to distinguish it from sintering used with known processes employing external pressure. It should be understood that one particular advantage of the method of the present invention is its capability of consolidation being conducted at ambient pressure. However, if one elected to do so the method could be conducted at higher pressure, although such excess Pressure is not necessary to practice of this method.

In certain specific examples evaluated in connection with the present invention, the matrix mixture included 50–93 wt % Al$_2$O$_3$ and 7–50 wt % pyrophyllite. Added to the mixture were one or more solvents, for example selected from ethyl alcohol, trichlorethane, methyl alcohol, toluene and methyl ethyl ketone, in an amount of about 60–85 wt % of the ceramic mixture of Al$_2$O$_3$ and pyrophyllite. A temporary binding system was used to hold the plies and preform in a shape prior to final sintering. For example in one series of evaluations, at least one binder in an amount of about 6–9 wt % of the ceramic mixture and at least one plasticizer in an amount of about 10–15 wt % of the ceramic mixture were included. Examples of such binders and plasticizers evaluated (and one commercial source) are Prestoline Master Mix (P.B.S. Chemical), cellulose ether (Dow Chemical), polyvinyl butyral (Monsanto) butyl benzyl phthalate (Monsanto), polyalkylene glycol (Union Carbide) and polyethylene glycol (Union Carbide). Binding systems also used were epoxy resins, for example general purpose epoxy resin manufactured by Ciba-Geigy, silicones, for example polysiloxane (GE), RTV (GE) and polycarbosilane (Union Carbide). Included as required were dispersants such as glycerol trioleate, marine oil, adipate polyester, sodium polyacrylate and phosphate ester. When epoxy resin was used as a binding system with the above ceramic matrix range, the solvent was 15–30 wt % and the epoxy was 15–35 wt %, in respect to the mixture.

Evaluated in connection with the present invention were a variety of ceramic reinforcement fibers including those shown in the following Table II, along with each of their coefficients of thermal expansion (CTE):

TABLE II

| REINFORCEMENT FIBERS | |
|---|---|
| TYPE | CTE × 10$^{-6}$ per °C. |
| A. MONOFILAMENTS | |
| Sapphire | 7–9 |
| Avco SCS-6 | 4.8 |
| Sigma | 4.8 |
| B. ROVINGS/YARN | |
| Nextel 440 | 4.4 |
| Nextel 480 | 4.4 |
| Sumitomo | 8.8 |
| DuPont FP | 7.0 |
| DuPont PRD-166 | 9.0 |
| UBE | 3.1 |
| Nicolon | 3.1 |
| Carbon | 0 |
| C. CHOPPED FIBERS/WHISKERS | |
| Nextel 440 | 4.4 |
| Saffil | 8.0 |

These data and typical examples and embodiments show the present invention as a significant improvement in the manufacture and provision of a consolidated, reinforced composite member. Use of such a member can be in a variety of types of apparatus, operating under different conditions of pressure, temperature, etc. Those skilled in the art will recognize and appreciate that such examples and embodiments are typical of rather than in any way limiting on the scope of the present invention as represented by the appended claims.

We claim:

1. In a method of making a consolidated, reinforced composite member comprising a matrix mixture having reduced tensile stresses and reinforcing fibers, the matrix mixture including a solvent, a plasticizer, a binder, a discontinuous ceramic material and a particulate inorganic filler having a lathy-type crystal shape, the steps of:

providing the matrix mixture including a preselected amount of the discontinuous material which will consolidate, producing shrinkage and associated stresses when sintered, a preselected amount of the particulate inorganic filler which will exhibit net expansion when heated to counteract the stresses in the matrix mixture caused by shrinkage of the discontinuous material during sintering;

providing a plurality of reinforcing fibers;

interspersing the matrix mixture about the reinforcing fibers;

laminating the matrix mixture and fibers into an article perform under a preselected pressure at a first temperature in the temperature range of 150°–400° F.;

heating the article preform to a second temperature above the first temperature and below a preselected sintering temperature to remove at least the solvent and the binder from the matrix mixture;

sintering the article preform at the preselected sintering temperature at ambient pressure at which the discontinuous material, in a substantially solid phase, consolidates to produce a substantially continuous matrix while the inorganic filler simultaneously expands to counteract stresses from consolidated of the discontinuous material so as to form a fiber-reinforced composite matrix with reduced tensile stresses.

2. The method of claim 1 in which the step of interspersing includes forming a plurality of plies, each ply comprising the matrix mixture about reinforcing fibers, the plies then shaped in relation to the composite member.

3. The method of claim 1 in which the discontinuous material comprises ceramic particles.

4. The method of claim 1 in which the reinforcing fibers comprise 10-50 volume percent of the composite member.

5. The method of claim 1 in which the particulate inorganic filler which exhibits net expansion when heated to the sintering temperature consists of inorganic material selected from the group consisting of pyrophyllite, wollastonite, mica, talc, montmorillonite, kyanite and their mixtures.

6. The method of claim 1 further including the step of forming a fiber reinforced ceramic composite matrix preform wherein the matrix mixture consists essentially of, by weight, 50-93% ceramic particles and 7-50% filler prior to the step of sintering and after the step of heating to a second temperature.

7. The method of claim 6 in which the ceramic particles are alumina and the filler is pyrophyllite.

8. The method of claim 1 in which:
the reinforcing fibers expand relative to the matrix mixture during the step of sintering; and
the proportion of the inorganic filler in the matrix mixture is selected so that expansion of the filler during the step of sintering counteracts stresses resulting from consolidation of the discontinuous material in the substantially solid state whereby after sintering, the matrix is substantially free of cracks from residual stresses perpendicular to the reinforcing fiber.

9. The method of claim 8 in which:
the discontinuous material comprises ceramic particles; and
the filler consists of inorganic material selected from the group consisting of pyrophyllite, wollastonite, mica, talc, montmorillonite, kyanite and their mixtures.

10. The method of claim 9 in which the filler consists essentially of wollastonite.

11. The method of claim 10 in which the sintered article preform consists essentially of, by weight, 50-93% alumina and 7-50% pyrophyllite.

12. The method of claim 9 in which the filler consists essentially of wollastonite.

13. A composite member preform, comprising:
a plurality of reinforcing fibers; and
a matrix mixture interspersed about the fibers;
the matrix mixture including a solvent, a binder, and a plasticizer, at least the solvent and binder being removable from the matrix mixture by heating the preform to a first temperature below a preselected sintering temperature, the matrix mixture further including a discontinuous ceramic material which consolidates in a substantially solid phase and produces a predetermined shrinkage amount and associated stresses by heating at a preselected sintering temperature at ambient pressure, and a particulate inorganic filler having a lathy-type crystal shape which exhibits net expansion relative to the discontinuous material when heated to the preselected sintering temperature, the matrix preform being pliable prior to heating to the first temperature;
The proportion of the inorganic filler in the mixture being selected so that expansion of the filler substantially counteracts matrix stresses due to consolidation of the discontinuous material and thermal stresses between the matrix and fibers at elevated temperatures.

14. The preform of claim 13 in which the reinforcing fibers comprise 10-50 volume percent of the preform.

15. The preform of claim 13 which comprises a plurality of plies, each having the matrix mixture interspersed about the reinforcing fibers, laminated into the preform.

16. The preform of claim 14 in which the filler consists of inorganic material selected from the group consisting of pyrophyllite, wollastonite, mica, talc, montmorillonite, kyanite and their mixtures.

17. The preform of claim 16 in which the filler consists essentially of pyrophyllite.

18. The preform of claim 17 in which the matrix mixture consists essentially of by weight, 50-93% ceramic, wherein the ceramic is alumina and 7-50% pyrophyllite.

19. The preform of claim 16 in which the filler consists essentially of wollastonite.

20. A sintered consolidated reinforced composite member comprising reinforcing fibers and a matrix interspersed about the fibers, wherein:
the matrix is a mixture of a discontinuous ceramic material and a filler of an inorganic material selected from the group consisting of wollastonite and pyrophyllite, and having a lathy-type crystal shape.

21. The member of claim 20 in which the reinforcing fibers are 10-50 volume percent of the member.

22. The member of claim 20 in which the matrix consists essentially of, by weight 50-93% alumina and 7-50% pyrophyllite.

23. A composite member preform comprising:
a plurality of reinforcing fibers; and
a matrix mixture interspersed about the fibers;
the reinforcing fibers exhibiting expansion relative to the matrix mixture when heated to elevated temperatures;
the matrix mixture including a solvent, a plasticizer and a binder blended with the matrix mixture, at least the solvent and plasticizer being removable by heating the member to a first temperature below a preselected sintering temperature,
the matrix mixture further including a discontinuous ceramic material which will consolidate, in a substantially solid phase by heating at the preselected sintering temperature, and a particulate inorganic filler having a lathy-type crystal shape which will exhibit net expansion relative to the discontinuous material when heated to the preselected sintering temperature;
the proportion of the inorganic filler in the matrix mixture being selected so that the net effect of expansion of the filler and the fibers and consolidation of the discontinuous material after preform sintering substantially eliminates matrix cracks perpendicular to the fiber axis resulting from overall preform shrinkage and associated stresses.

24. The preform of claim 23 in which the reinforcing fibers comprise 10-50 volume percent of the preform.

25. The preform of claim 23 which comprises a plurality of plies, each ply comprised of a matrix mixture about the reinforcing fibers, laminated into a preform.

26. The preform of claim 23 in which the discontinuous material comprises ceramic particles.

27. The preform of claim 26 in which the filler consists of inorganic material selected from the group consisting of pyrophyllite, wollastonite, mica, talc, montmorillonite, kyanite and their mixture.

28. The preform of claim 27 in which the filler consists of essentially of pyrophyllite.

29. The preform of claim 28 in which the matrix mixture consists essentially of, by weight, 50-90% alumina and 7-50% pyrophyllite.

30. The preform of claim 27 in which the filler consists essentially of wollastonite.

31. The preform of claim 23 in which the reinforcing fibers are selected from the group of monofilaments consisting of sapphire, silicon carbide and mixtures thereof.

32. The preform of claim 23 in which the reinforcing fibers are selected from the group of rovings and yarns consisting of aluminum oxide, silicon dioxide, boron oxide and mixtures thereof.

33. The preform of claim 23 in which the reinforcing fibers are selected from the group of chopped fibers and whiskers consisting of aluminum oxide, silicon dioxide, boron oxide and mixtures thereof.

* * * * *